United States Patent Office 3,365,048
Patented Jan. 23, 1968

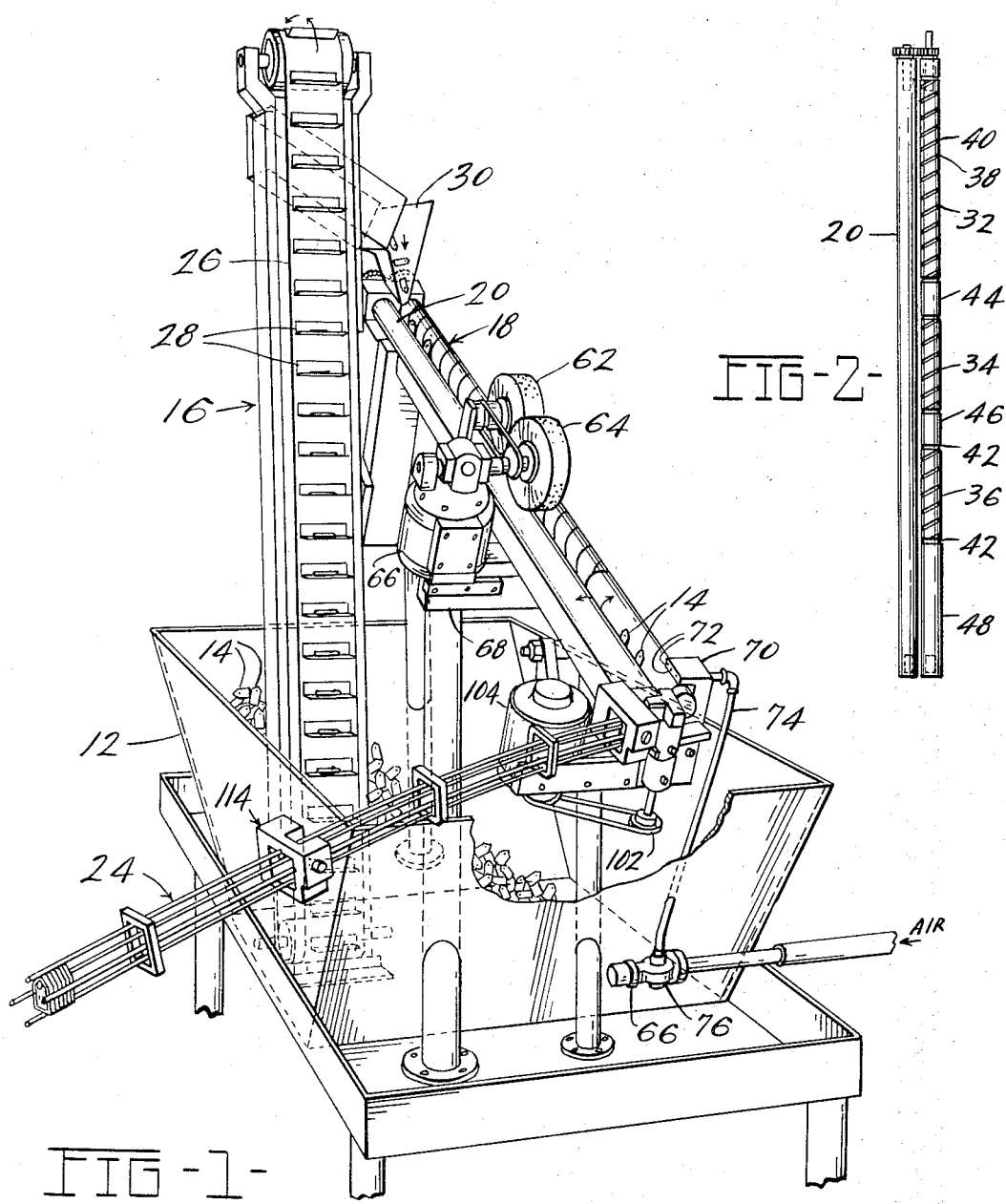

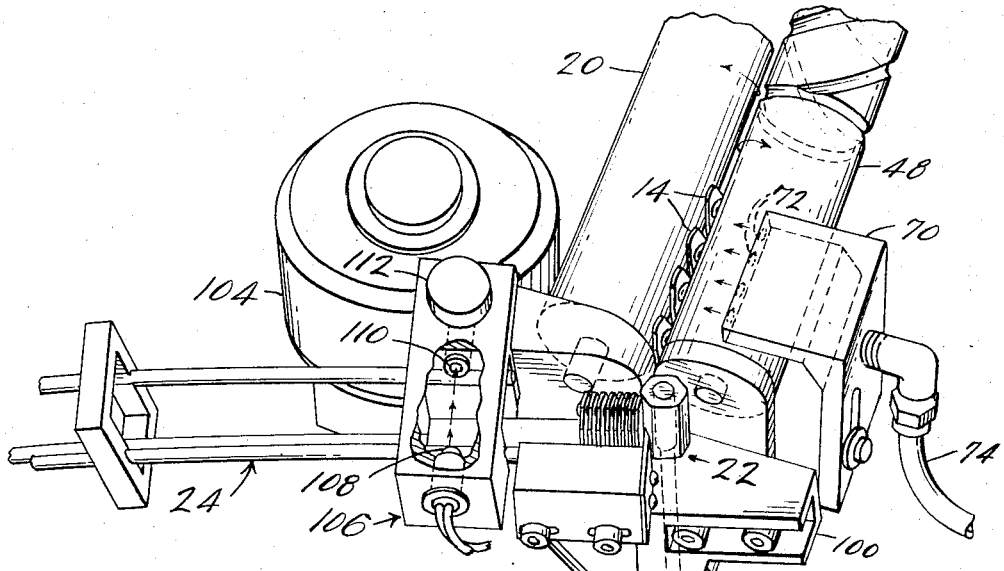
FIG-3-
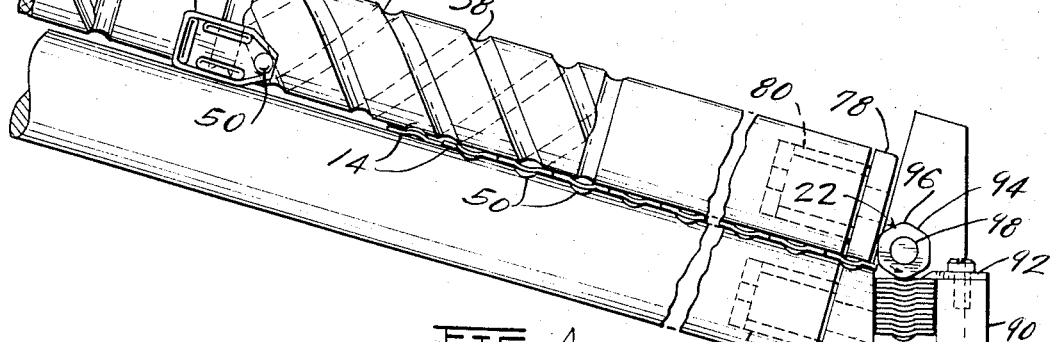
FIG-4-
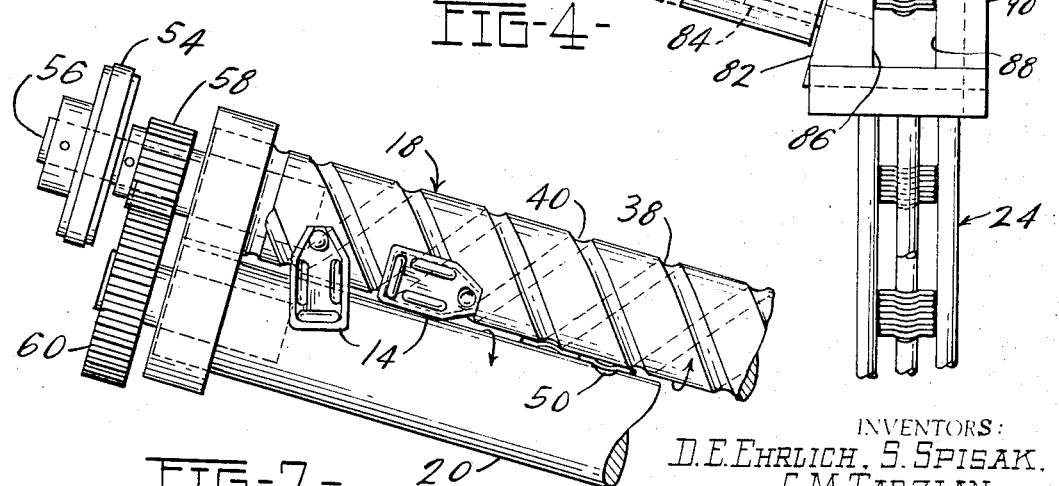
FIG-7-
INVENTORS:
D.E.EHRLICH, S.SPISAK,
G.M.TARZIAN.
BY
ATT'YS.

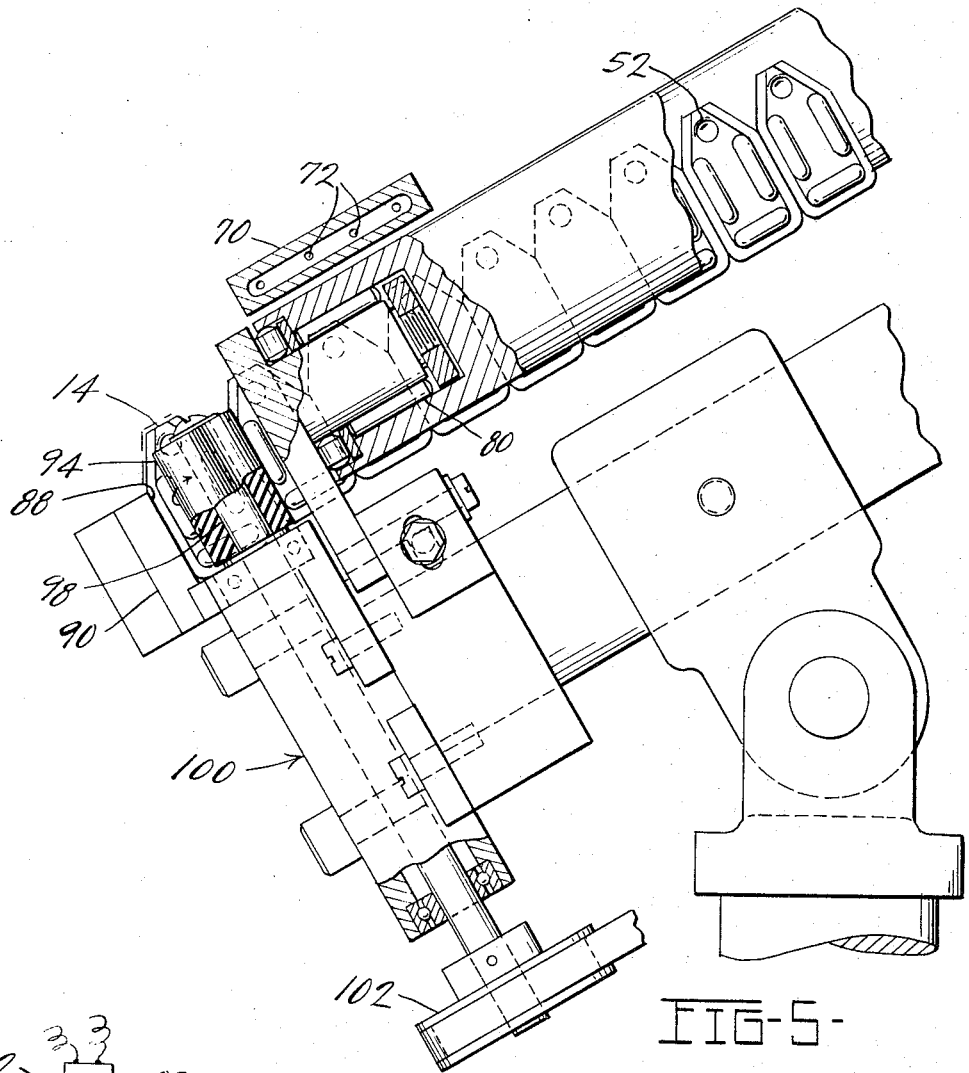
FIG-5-
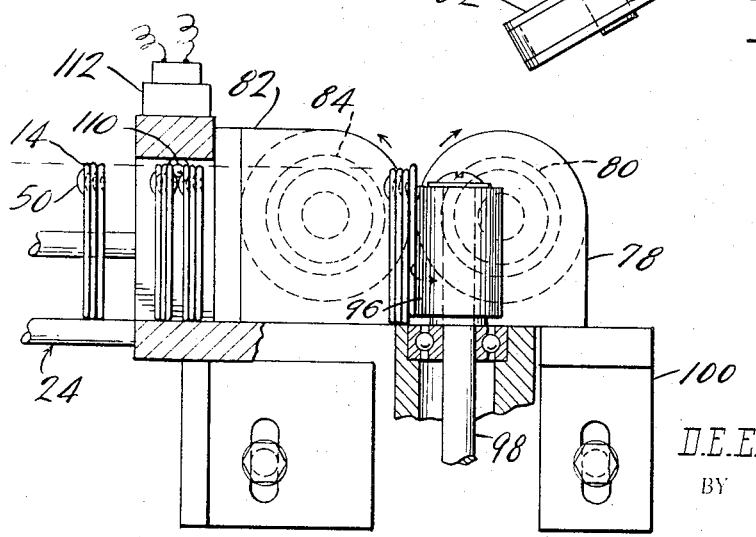
FIG-6-
INVENTORS:
D.E. EHRLICH, S. SPISAK.
G.M. TARZIAN.
BY
ATT'YS.

3,365,048
APPARATUS FOR ORIENTING AND
FEEDING PARTS
Don E. Ehrlich, Avon, and Steve Spisak, Elyria, Ohio, and George M. Tarzian, Chicago, Ill., assignors to Gregory Industries, Inc., Lorain, Ohio, a corporation of Michigan
Filed Sept. 30, 1966, Ser. No. 583,341
20 Claims. (Cl. 198—33)

ABSTRACT OF THE DISCLOSURE

A device for both orienting and feeding parts is provided. The device includes a pair of parallel, slanted rollers, one of which has a helical groove therealong and the other of which is plain. The rollers carry tabs having projections on one side thereof with the tabs falling between the rollers if the projections face toward the grooved roller and otherwise are carried down the roller. A resilient non-circular roll at the ends of the rollers feeds the tabs into a stack and electric eyes are provided to sense the stack when empty and also if the tabs are improperly stacked therein. The device has utmost reliability which is particularly important where damage can result to a machine to which an improperly oriented tab might be fed.

This invention relates to apparatus for orienting and feeding parts and particularly tabs which require both endwise and sidewise orientation.

Apparatus according to the invention is particularly useful for orienting and feeding opening tabs for can lids to welding apparatus which welds projections of the tabs to the can lids, as discussed in a co-pending application of Don E. Ehrlich, Ser. No. 563,914, filed July 8, 1966. When the tabs are to be welded to the can lids, they must be arranged with the weldable projections extending downwardly and at a given end of the tabs. Not only must the tabs be properly oriented endwise and sidewise, but they must be fed at high rates, in the order of 250–300 tabs per minute.

The apparatus embodying the invention includes means for supplying the tabs in a random manner to the upper end of an inclined track or groove formed by a pair of substantially parallel, counterrotating feed rollers or rods, one of which has a helical groove extending therealong. The tabs hang downwardly between the rollers, being held at their upper ends by the projections, with those tabs which have the projections facing the groove, then falling downwardly between the rollers. The remaining tabs with the projections at the upper ends and extending toward the plain roller are carried down to the lower ends of the rollers and then fed with the aid of a resilient roll to a stacked row of the tabs in a supply track which can be formed with the aid of a plurality of bendable guide rods. The feeder is capable of handling the tabs at a rate at least equal to that required by the welding machine, and disposing of excess tabs when necessary.

It is, therefore, a principal object of the invention to provide an improved apparatus for orienting and feeding parts in large quantities per unit of time.

Many other objects and advantages of the invention will be apparent from the following detailed description of a preferred embodiment thereof, reference being made to the accompanying drawings, in which:

FIG. 1 is a view in perspective of the overall apparatus for feeding and orienting tabs in accordance with the invention;

FIG. 2 is a top view of a pair of feed rollers constituting a part of the apparatus;

FIG. 3 is a view in perspective of lower ends of the feed rollers where the tabs are transferred to a supply track;

FIG. 4 is a plan view of the apparatus of FIG 3;

FIG. 5 is a side view in elevation, with parts broken away and with parts in section, of the components of FIGS. 3 and 4;

FIG. 6 is an end view of the lower end of the apparatus of FIGS. 3–5 and further showing means for sensing improperly oriented tabs; and FIG. 7 is a fragmentary plan view of the upper end of the feed rollers of FIG. 2.

Referring to the drawings and more particularly to FIG. 1, the apparatus embodying the invention basically includes a supply hopper 12 containing a multiplicity of randomly-disposed tabs 14 which are carried by a vertical conveyor 16 to the upper end of a pair of orienting and feed rollers or rods 18 and 20. At the lower end of the rollers 18 and 20, the tabs 14 are moved by a resilient roll 22 into a stacked or nested row held in a supply track 24 which directs the tabs to the welding machine.

The hopper 12 can be of any suitable size and can be large enough to catch the tabs 14 dropping off the rollers 18 and 20. The bottom of the hopper 12 preferably is contoured in a manner such as to direct tabs therein to the bottom of the vertical conveyor 16. The conveyor 16 can be of any suitable type to remove the tabs 14 from the hopper in small quantities and, as shown, includes a belt 26 driven in a vertical path by a suitable motor (not shown) with scoops 28 suitably affixed to the belt to gather and carry upwardly small quantities, up to perhaps two dozen, of the tabs 14. The tabs are dropped over the upper end of the conveyor 16 into a V-shaped trough 30 from which they slide downwardly to the upper end of the rollers 18 and 20.

The roller 18 actually has three sections 32, 34, and 36, as shown in FIG. 2, each of twin helical grooves 38 and 40. Each of the sections 32, 34, and 36 terminates in circular grooves 42 with two cylindrical, plain or smooth sections 44 and 46 of the roller being located between the three grooved sections and a longer lower plain or smooth cylindrical section 48 located below the lower section 36 of the grooves 38 and 40. The discontinuity of the grooves 38 and 40 terminating in the circular grooves 42 enables improperly oriented tabs to drop between the rollers 18 and 20 more effectively than if the helical grooves were continuous over the entire length of the roller 18. However, the helical grooves can be continuous without the circular grooves or the circular grooves can even be spaced from the ends of the helical grooves. The helical grooves can also be discontinuous, preferably with the path of the second groove displaced from the path of the first groove. If the rollers are horizontal, then the grooves preferably should be continuous over the length thereof since they are the sole means for moving the tabs along the rollers.

The tabs 14 have weldable projections or portions 50 extending from one side thereof, as shown in FIG. 7, with corresponding dimples 52 on the opposite side, as shown in FIG. 5. When the projections extend toward the plain roller 20, the tabs are held between the rollers which are spaced apart a distance sufficient to receive the main bodies of the tabs but not a combination of the bodies and projections. Consequently, and since the projections are to one side of the centers of gravity of the bodies, the tabs hang in on-end positions with the projections at the upper ends, as shown in FIGS. 3–5. On the other hand, if the projections 50 should be facing toward the grooved roller 18, when the projections become aligned with the groove 38, 40, or 42, the tabs drop downwardly between the rollers to the hopper and subsequently are fed upwardly once again to the upper end of the rollers by the vertical conveyor. By providing the discontinuities in the grooves 38 and 40, the projections 50 are more certain to come into alignment with one of the helical grooves 38 or 40 or the circular groove 42 when moving downwardly along the rollers. Otherwise, it is possible for one of the tabs to be carried downwardly with other tabs in a manner such that a projection of the improperly oriented tab is never aligned with one of the grooves.

The rollers 18 and 20 are driven in counterrotating directions by means of a motor (not shown) which drives a pulley 54 (FIG. 7) mounted on a stub shaft 56 of the roller 18. The pulley 54, in turn, drives a spur gear 58 which meshes with a spur gear 60 connected with the roller 20. Preferably, the grooved roller 18 rotates faster than the roller 20, with a ratio in the order of 3:1. In fact, particularly if the rollers are at a steeper angle, the smooth roller 20 need not rotate at all, although rotation thereof helps to move the tabs along the rollers. The roller 18, on the other hand, requires a relatively rapid rate of rotation, in the order of 300 r.p.m., to enable the tabs to move down the rollers at a rate sufficient to supply the necessary 250–300 tabs per minute to the welding machine. The grooves 38 and 40 on the roller 18 help to feed the tabs therealong as well as to dispose of those not properly oriented. The angle of the rollers to the horizontal can be from 0° up to 35°, with 20°–30° preferred. Generally, a steeper angle enables a greater output to be achieved but increases the chance for an improperly oriented tab to reach the lower ends of the rollers.

With the large quantities of tabs handled by the apparatus, some tabs will ride along the rollers above the closest portions thereof and, if not removed prior to reaching the lower end of the rollers, can cause jamming at the lower end. To prevent this, a pair of rotating brushes 62 and 64 are mounted centrally above the rollers and at an intermediate point approximately midway between the ends thereof. These brushes are rotated in clockwise directions, as shown in FIG. 1, through a motor 66 mounted on a support 68, to engage the tabs carried on the rollers 18 and 20 and not actually hanging down between them. The brushes thereby push these tabs upwardly, causing them to move downwardly to depending positions between the rollers or to drop off the sides thereof.

With the lower ends of both rollers being smooth or plain, represented by the section 48 of the roller 18, the oriented tabs can hang therebetween waiting to move into the supply row, in the event that the supply row is full at the time the tabs reach the lower ends of the rollers. If enough tabs are backed up at the lower ends of the rollers, some may lay on top of the rollers, and others hanging therebetween may be pushed upwardly by the action of the counterrotating rollers. Also, some tabs may escape the brushes 62 and 64, so as to remain on top of the rollers at the lower end thereof. Such tabs are blown off the rollers by a blower 70 having several ports 72 directed transversely across the top of the rollers so as to easily remove any tabs thereon without disturbing the depending tabs hanging between the rollers by means of the projections. Air can be supplied to the blower 70 through a line 74 which is controlled by a solenoid-operated valve 76 which opens to enable air to be supplied to the blower at all times during which the apparatus is operating.

A support 78 at the lower end of the grooved roller 18 has a semicircular contoured top forming a stationary extension for the roller 18. The support 78 carries a needle bearing 80 extending into a recess in the end of the roller to provide a rotatable support therefor. A second support 82 has a contoured upper corner forming a stationary extension for the plain roller 20 and also carries a needle bearing 84 similar to the bearing 80 and extending into a recess in the lower end of the roller 20. The bearings 80 and 84 thereby support the rollers without any interference with the tabs while the contoured supports 78 and 82 provide a stationary exit for the tabs at the lower ends of the rollers to assure that they will be deposited uniformly therefrom.

An outer surface 86 of the support 82 provides one side of a stacking passage 88 extending transversely from the lower end of the rollers. The opposite side of the passage is defined by a block 90 which also supports a front wall 92 having a tapered edge 94 extending close to the resilient roll 22. The roll 22, which can be of rubber or other suitable resilient material, is of non-circular configuration and has a plurality, preferably six, of lobes or high points 96 capable of engaging a tab exiting from between the stationary supports 78 and 82 and moving this tab to the end of the row formed in the supply track 24, at the same time forcing the tabs forwardly slightly so that the rear tab moves in front of the wall 92. The roll 22 is mounted on a drive shaft 98 which extends through a platform 100, in which it is rotatably mounted, to a pulley 102 driven by a motor 104. The platform 100 also serves as a floor for the passage 88, as well as a support for the block 90. The non-circular configuration, along with the resilient characteristic, of the roll 22 enable it to remove the tabs from the rollers and assemble them in the exiting supply row at a high rate of speed and with a high degree of reliability.

A housnig 106 is located at the end of the passage 88 and at the beginning of the supply track 24. The housing 106 contains a lamp or other suitable light source 108 on one side of the passage and a light-sensitive photoelectric cell 110 on the opposite side. In the event that one of the tabs 14 enters the passage 88 with the projection 50 reversed or at the wrong end, the projection 50 will be in contact with the projection or body of an adjacent tab, with a space resulting between the main bodies of the tabs, as shown in FIG. 7. Light from the source 108 will then strike and energize the cell 110. This energizes a signal such a buzzer and a light 112 which can be on top of the housing 106 or located at a control cabinet or other suitable, remote location. An operator can then remove the improperly oriented tab. In the event that this tab is not removed by the time the row of tabs reaches a second housing 114 (FIG. 1), a similar photocell is energized by a similar light source and causes the entire feeder to be shut down. This arrangement also is effective to indicate that the source of tabs is exhausted or that the studs have jammed at the feeder. In such an instance, the tabs are no longer packed tightly in the track 24 but slanted downwardly until the light source is exposed to the photocell above the upper ends of the slanted tabs. The feeder then shuts down, as before.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. Apparatus for orienting and feeding tabs which have projections located toward one end thereof and extending from one surface thereof, said apparatus comprising a pair of substantially parallel rollers, one of said rollers having groove means of a size sufficient to pass projections of the tabs, the other roller being plain, whereby tabs will fall between the rollers if the projection is facing the grooved roller but will be carried along the rollers if facing the plain roller, means for counterrotating said rollers, means for supplying tabs to ends of said rollers, and means at the other ends of said rollers for removing oriented tabs fed between the rollers.

2. Apparatus according to claim 1 wherein said means at said other ends of said rollers constitutes a resilient roll having a non-circular cross section and positioned to engage the tabs as they emerge from the ends of the rollers and push the tabs sequentially into a nested row.

3. Apparatus according to claim 2 characterized by wall means adjacent said resilient roll generally on the side opposite said parallel rollers to aid in stacking and retaining the tabs in the row.

4. Apparatus according to claim 2 characterized by means at said other ends of said rollers for rotatably supporting said rollers and for establishing stationary surfaces at the emerging portions of said rollers.

5. Apparatus according to claim 2 characterized by means adjacent the nested row of tabs for detecting improper stacking of the tabs.

6. Apparatus according to claim 5 further characterized by signal means operated by said detecting means when improper stacking of the tabs is sensed.

7. Apparatus according to claim 6 further characterized by an additional sensing means located beyond said first sensing means away from said rollers for detecting improper stacking of the tabs and for shutting down said apparatus when such tabs are sensed.

8. Apparatus according to claim 1 characterized by blower means for directing a stream of air transversely across the top of said rollers near said other ends thereof to remove any tabs extending above said rollers.

9. Apparatus according to claim 1 characterized by means located above said rollers at intermediate points thereof for engaging and removing tabs located on said rollers and lying entirely above the closest surfaces of said rollers.

10. Apparatus according to claim 9 wherein said means constitutes a brush, and means for rotating said brush.

11. Apparatus according to claim 1 further characterized by a source of randomly-disposed tabs, and said means for supplying tabs to ends of said rollers constitutes conveyor means moving the tabs to the ends of said rollers from said source.

12. Apparatus according to claim 1 wherein said means for counterrotating said rollers causes said rollers to counterrotate with the closest surfaces thereof moving upwardly.

13. Apparatus according to claim 1 characterized by said groove means constituting a helical groove located along a substantial portion of said one roller.

14. Apparatus according to claim 13 characterized by said groove means extending along spaced portions of said one roller and terminating in circular grooves.

15. Apparatus according to claim 14 further characterized by said one roller having ungrooved, plain sections between said grooved portions.

16. Apparatus for orienting and feeding parts comprising two parallel, adjacent rollers for receiving and orienting the parts and for moving the parts from one end thereof toward the other, one of said rollers being plain over at least a substantial portion of the length thereof and the other of said rollers having a helical groove extending along a substantial portion thereof with the groove being of sufficient size to receive and pass a portion of an improperly oriented part, a resilient, non-circular roll at an end of said roller means for receiving the endmost part from said roller means and for moving the part to the end of a nested row of parts, and means for rotating said roll in a direction to move the parts from the end of said roller means to said row.

17. Apparatus according to claim 16 characterized by a wall located adjacent said roll for aiding in directing the part engaged by said roll to the end of said row and for supporting the endmost part in the row.

18. Apparatus according to claim 16 characterized by said roll having a plurality of lobes thereon substantially equally spaced therearound.

19. Apparatus according to claim 16 characterized by sensing means near the roll for detecting improperly oriented parts and for energizing signal means in response thereto.

20. Apparatus for orienting and feeding parts which have projecting portions spaced from the center of gravity thereof, said apparatus comprising a source of randomly-disposed parts, a pair of substantially parallel, slanted rollers, one of said rollers having a spiral groove along at least two sections thereof, said grooved roller having an ungrooved section between said grooved sections and an ungrooved section at the lower end thereof, said groove being of a size sufficient to pass said portions of the parts, the other roller being ungrooved, means for counterrotating said rollers with the closest surfaces moving upwardly, conveyor means for supplying parts from said source to the upper ends of said rollers, means positioned above said rollers for removing parts located on top of said rollers prior to reaching the lower end thereof, means rotatably supporting the lower ends of said rollers and forming stationary exit portions for said rollers, a resilient, non-circular roll located at the lower ends of said rollers to receive the endmost part exiting from said stationary portions, means for rotating said roll to move the endmost part into a nested row of parts, and means adjacent said roll to aid in directing the parts into said row and to aid in maintaining the parts in said row.

References Cited

UNITED STATES PATENTS

| | | | |
|---|---|---|---|
| 1,791,390 | 2/1931 | Den Boer | 214—7 |
| 1,921,485 | 8/1933 | Seger | 221—162 |
| 2,358,413 | 9/1944 | Monaco | 214—7 |
| 2,377,431 | 6/1945 | Lakso | 198—33 |
| 2,571,576 | 10/1951 | Hopkins | 221—175 |
| 2,698,694 | 1/1955 | Schwartz | 214—7 |
| 2,832,457 | 4/1958 | Randles | 198—33 |
| 3,295,661 | 1/1967 | Mitchell | 198—33 |

RICHARD E. AEGERTER, *Primary Examiner.*